Sept. 19, 1961 F. H. FROST ET AL Re. 25,039
METHOD OF PRODUCING HIGH GLOSS MINERAL-COATED PAPER AND RESULTANT PRODUCT
Original Filed March 20, 1953
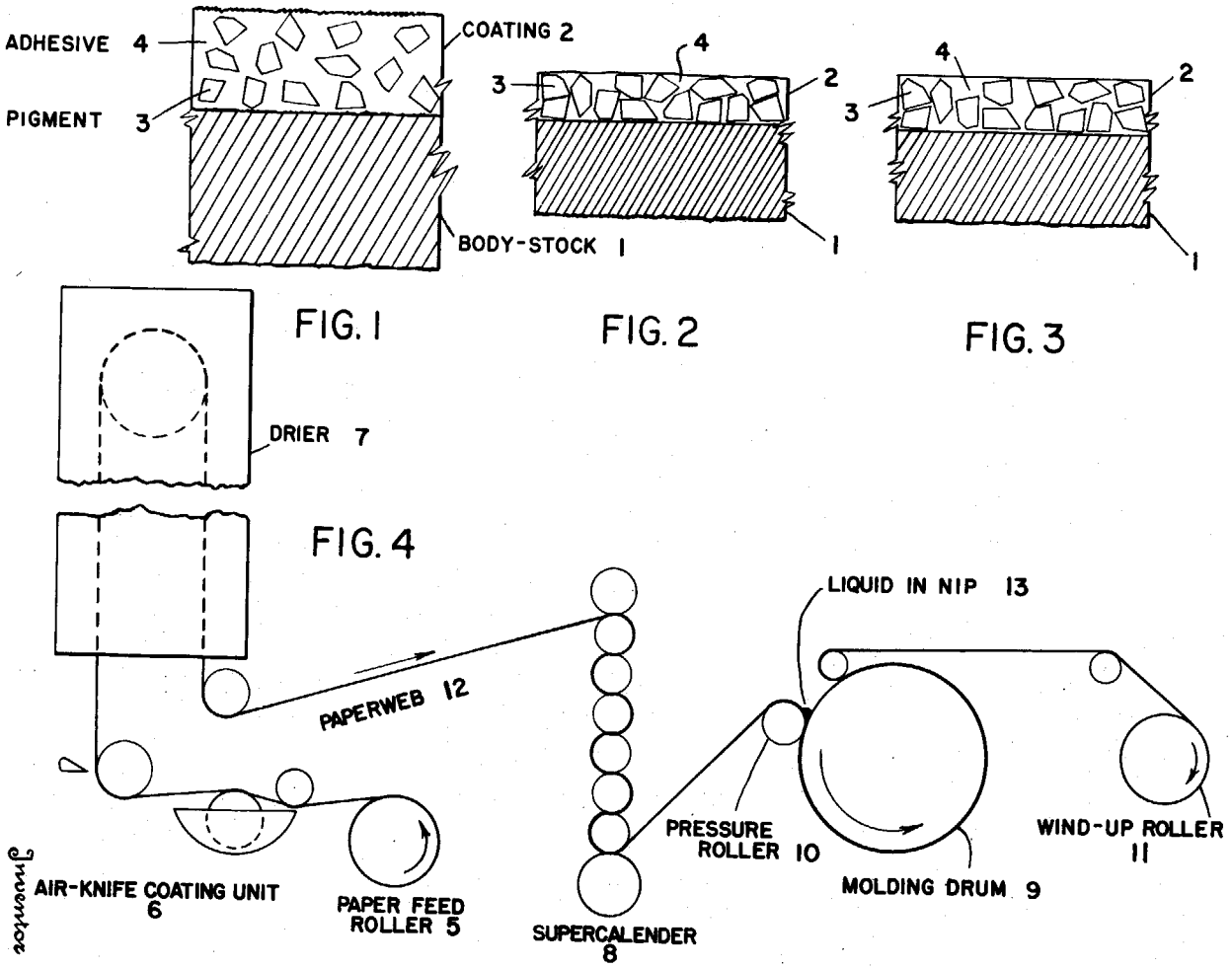
Inventor
Frederick H. Frost
By Philip S. Leighton
Pierce, Scheffler & Parker
Their ATTORNEYS United States Patent Office Re. 25,039
Reissued Sept. 19, 1961

25,039

METHOD OF PRODUCING HIGH GLOSS MINERAL-COATED PAPER AND RESULTANT PRODUCT

Frederick H. Frost, Portland, and Philip S. Leighton, Westbrook, Maine, assignors to S. D. Warren Company, Boston, Mass., a corporation of Massachusetts Original No. 2,759,847, dated Aug. 21, 1956, Ser. No. 343,584, Mar. 20, 1953. Application for reissue May 19, 1958, Ser. No. 736,422
4 Claims. (Cl. 117—64)

Matter enclosed in heavy brackets [ ] appears in the original patent but forms no part of this reissue specification; matter printed in italics indicates the additions made by reissue.

This invention relates to the production of mineral-coated sheet material coated on one or both sides and having a very high gloss and a very level surface, and to the glossy mineral-coated sheet material so produced.

In the production of mineral coated paper a paper base which has been surface-sized, surface-filled, or which may be coated or uncoated, is coated with an aqueous composition comprising mineral pigment such as clay, blanc fixe, calcium carbonate, talc, titanium dioxide, various colored pigments or the like and adhesive material such as casein, starch, glue, poylvinyl alcohol, synthetic elastomer, or the like. The coated surface is then dried and smoothed. Customarily from a minimum of about one pound to a maximum of about seven pounds of dry weight of coating is applied to each 1000 sq. ft. of surface coated. The lighter weights of coating are used if the base paper has been previously coated whereas the heavier weights are used on base paper which has not been previously coated or surface filled. Thus the coating may be applied in one layer or in two or more layers as desired; either one or both sides of the web may be coated. Most coated papers are first dried and then smoothed by calendering and such papers constitute the standard "glossy coated" papers of commerce. Such papers possess an attractive sheen but do not have a high specular or mirror-like gloss approximating, for instance, that of polished metal surfaces.

For producing a high specular gloss on coated paper surfaces which are normally used for commercial printing purposes there are presently in use only three commercial methods, namely: flint-glazing, buffing as disclosed by Clark Patent No. 2,349,704, and cast coating as disclosed by Bradner Patent No. 1,719,166 and Warner Patent No. 2,316,202. A fourth method of producing glossy-coated paper is by friction-glazing, by which the coated surface is burnished by a rapidly turning metal roll, usually heated. The result so produced is somewhat similar, but generally quite inferior, to that obtained by flint-glazing. Generally speaking, the friction-glazed product is not sufficiently high in specular gloss to be in the same class as the products previously mentioned.

The present invention has for its object the production of mineral-coated paper having high specular gloss at least comparable to that of paper produced by the before mentioned known methods.

The present invention is based on the discovery that the application of aqueous liquid to the surface of a hard, dry, densified supercalendered coating comprising hydrophilic material on a sheet of paper just as it passes into the nip between a highly polished roll and a backing roll with the coating facing the polished roll will cause the hydrophilic material at the surface of the coating to swell, become moldable and by expansion to be pressed against and molded by the polished roll, thereby receiving a surface which is complementary to that of the polished roll and that the novel paper so produced may have a gloss at least equal to that made by any other process of which we are aware.

According to the invention a paper web or other flexible sheet material is coated by any desired means, e.g., roll coater, brush coater, etc., with one or more applications of an aqueous hydrophilic coating composition comprising a finely divided coating pigment such as clay, a hydrophilic material and sufficient adhesive material to bind the pigment to the paper base. The hydrophilic material and the adhesive material may be identical or different. Suitable hydrophilic materials include casein, starch, soy protein, glue and polyvinyl alcohol, which may be used singly, mixed with each other, or mixed with a substantial proportion of an elastomer such as synthetic rubber latex. The paper web so coated is then dried and densified by calendering, under considerable pressure, as by a supercalender. It is not necessary to calender enough to develop high gloss, but it is necessary to use enough pressure to densify the coating and it is advantageous to render the surface fairly level; it is permissible, but not essential, to calender until a high supercalendered gloss is obtained. The weight of coating of the finished paper may be the same as in the prior methods referred to.

In contrast to this procedure in the method of cast coating described in Patents 1,719,166 and 2,316,202, the cast coated paper is neither air-dried nor calendered. Instead, the wet freshly coated paper is rolled tightly against the surface of a heated drum and is there dried. Thus cast-surfaced coated paper is made without the use of a supercalender with its high pressures and the coating on its surface has a higher bulk and greater ink absorbency than paper which is made according to the present invention.

In the method of this invention, the densified coated surface is wet with an aqueous liquid as the paper passes into the nip of a pair of rolls one of which is heated and has a polished surface complementary to that of the glossy surface of the paper to be produced. The other roll is preferably a rubber-covered backing roll. The aqueous liquid is applied to the densified surface as closely as possible to the nip of the two rolls, so that the swelling of the hydrophilic component of the coating takes place as nearly coincidentally as possible with the passage of the wetted portion of the coating into and through the nip of the rolls, and before the aqueous liquid has had time to penetrate the coating and pass into the backing sheet. The coating remains in contact with the heated polished surface until it has dried. When dry, the paper comes away easily from the polished support and has a surface which is substantially the mirror image of the polished roll surface. If the roll surface is highly polished, the coated paper dried against it will exhibit an extremely high gloss.

The most satisfactory way of applying an aqueous liquid to the coating without penetration to the backing sheet is by keeping the nip between the paper and the polished roll surface filled or flooded with aqueous liquid. Liquid may be injected directly into the nip, or it may be applied to the polished roll surface before the latter comes into contact with the surface of the coating or both in quantity sufficient to keep the nip filled and flooded.

With some coatings water alone is an entirely satisfactory wetting liquid; with other coatings which are more water-resistant, such as coatings containing a considerable proportion of a synthetic elastomer or partially waterproofed casein, it is advantageous to use an aqueous solution of wetting and/or swelling agent or the like. A dilute solution of ammonia is effective in some such instances.

It is advantageous in some instances to include in the coating composition applied to the paper a small quantity of an anti-sticking or parting agent to facilitate release of the dry coated surface from the polished surface after it has dried in contact therewith. Soaps and solid polyethylene glycol are useful anti-sticking agents. If the dried coating parts from the polished surface with difficulty, parting may be facilitated by adding a small quantity of anti-sticking agent to the aqueous liquid in the nip; a trace of glycol monolaurate or ammonium stearate dissolved in the aqueous liquid is found very effective.

The best results appear to be obtained when the following conditions are observed:

(1) That the sheet material used bear on at least one side a surface layer of mineral-coating containing some hydrophilic material, preferably a hydrophilic adhesive material, which is swellable by absorption of aqueous liquid.

(2) That the coating be densified and the gross irregularities in the levelness thereof removed.

(3) That the coated sheet be dry, e.g. substantially air-dry, before aqueous liquid is applied to the surface thereof according to the invention.

(4) That the application of aqueous liquid to the surface of the coating take place as nearly simultaneously as practicable with the entrance of the wetted portion into the nip of the rolls so that the wetted surface will be in the nip of the rolls as the hydrophilic component of the coating swells.

(5) That the quantity of aqueous liquid applied be limited so that the swelling of the hydrophilic material will take place before substantially any of the aqueous liquid can penetrate into the paper base.

(6) That the wetted surface of the coating remain in contact with the polished drying surface until substantially dry.

Normally, when mineral-coated paper is densified by calendering the surface produced looks reasonably level to the unaided eye. Under a microscope, however, the surface is seen to be made up of juxtaposed high, glossy areas, and lower, less glossy areas.

Commonly, there are also visible under the microscope fairly numerous and relatively deep depressions or froth-pits in the coated surface. The supercalendering operation considerably decreases the thickness of the coating originally applied and densifies it, accomplishing that result by pushing nearer together the individual particles of mineral pigment and thus decreasing the size, but not the number, of the interstices therebetween. At the same time the elevation of the high spots above the low spots is considerably decreased; froth-pits, however, are so comparatively large that little difference in their appearance is noticed after the supercalendering operation.

When such a supercalendered mineral-coated paper is passed through a nip which is kept filled or flooded with aqueous liquid, the quantity of said aqueous liquid passing the nip apparently will be the sum of the following quantities; (1) the quantity which forms a liquid film between the surface of the coating and the surface of the drum, (2) the quantity which penetrates into the interstices between particles, and (3) the quantity which is actually absorbed by the hydrophilic material present in the coating. Of these three quantities the second and third are by far the most important in relation to the quality of the finished product of the invention. In the case of properly supercalendered mineral-coated paper the total quantity of aqueous liquid taken up in practicing the invention is so comparatively little that it can be readily retained at the surface of the coating or without penetrating the underlying paper base. On the other hand, in the case of a coating which has not been densified the roughness of the coating permits the trapping of a considerable quantity of aqueous liquid between the surface thereof and the surface against which it may be passed in a nip, e.g. the finishing drum surface—a quantity which may be greater than the coating layer itself may be able to absorb completely. Moreover, when the interstices between pigment particles have not been partly closed, as by a calendering operation, they afford effective passages to the underlying paper base which are easily penetrable by aqueous liquid; and when the paper base once becomes wetted thereby, the wet fibers may then act as wicks to drain liquid from the coating. This may be the explanation of the noted fact that uncalendered mineral-coated papers do not yield as satisfactory results when treated by the polishing process of the invention.

Ideally in the practice of the invention the surface of the coating acquires a mirror image of the polished surface against which it is pressed and dried. Variables which affect the degree to which the ideal is approached are (1) the degree in which the hydrophilic adhesive or other hydrophilic material quickly swells, and (2) the external pressure applied in the nip which forces the paper surface against the polished drying surface. Both variables aid in obtaining intimate contact between the surface of densified coating and the surface of the drum.

The most feasible polished surface against which the mineral-coated paper may be pressed in the practice of the invention is a metal drum of good size, say 6 feet or more in diameter, which is internally heated, and suitably is plated with chromium, polished and maintained by conventional methods. For use to press the coated paper undergoing treatment against the drum the most suitable means appears to be a rubber-covered roll soft enough to ensure substantially even pressure across the entire sheet or web of the paper. In such a set-up, a nip of appreciable width, i.e., the distance from front to back, is produced and while the nip pressure readily may amount to at least one hundred pounds per linear inch across the width of the sheet, such pressure is far less than the high pressures customarily used in supercalenders. If a supercalendered mineral-coated paper containing no hydrophilic material which is in the least swelled by aqueous liquid applied thereto, is treated according to the invention, no amount of pressure expedient to apply will appreciably affect that sheet.

If, however, the hydrophilic matter present in the surface of the coating is swelled, even to a very slight extent, by aqueous liquid applied thereto, the coating is to some extent rendered moldable and when pressed against the polished surface it is molded to conform to the surface of the polished roll. In such a case the degree of deformation of the surface of the coating and consequent increase in polish or gloss varies with the pressure which is applied to it in the nip. The gloss obtainable by such treatment is very high indeed. The operation itself differs from conventional calendering, in that in part at least, the pressure which molds the surface of the sheet is supplied by the swelling of the hydrophilic component of the densified coating and that the swollen or moldable mineral-coating adheres firmly to the surface of the polished drum until the coating has become dry again. The effect of the treatment on the paper is that the gloss imparted thereby is much higher than that obtainable by the severest supercalendering, but dinginess or blackening is not increased and may be decreased.

Since only a very small quantity of aqueous liquid passes through the nip, the drying problem is much less difficult and relatively high speeds can be attained even on a drum of small diameter and the expense for equipment is reduced since polished drums even of small diameter cost thousands of dollars. Moreover, and more important, because only a very small amount of aqueous liquid is involved and has to escape as water vapor through the reverse side of the sheet, it is possible to turn the sheet over and subject the reverse side to the same process without appreciably affecting the finish previously developed on the first side. Thus the process of the invention is capable of producing mineral-coated paper having both sides with substantially identical appearance and high gloss free from visible imperfections while by the prior processes it has been difficult or perhaps impossible to produce commercially a coated paper having satisfactory high gloss on both sides, except by flint-glazing or buffing.

As the swelling increases, the surface is reshaped and molded against the polished drum. If the coating swells enough small froth-pits and other small surface defects originally present may even disappear. The coating after being dried may be found to have expanded slightly and to have become slightly less dense; though the change is exceedingly small. The small decrease in density, however, is effective in decreasing or removing dinginess or mottle that may have been present as a result of supercalendering. Concomitantly the brightness of the coating is improved and the opacity may be slightly increased by the treatment. The coated surface embodying the present invention is free from the cross-grain microscopic scratches observable in the surface of glossy flint-gazed paper and from the longitudinal microscopic scratches observable on the surface of the glossy buffed paper made according to aforementioned Clark Patent No. 2,359,704. Moreover, the product does not show under a microscope the outlines of fibers which are often observable in commercial so-called cast-coated papers, doubtless because under the invention the paper base itself is not wetted by the aqueous liquid.

Because the coating of the product of the invention has been so compressed or densified, the product can be printed by regular printing inks commonly used for printing ordinary supercalendered, glossy, mineral-coated printing paper, and does not necessitate the use of the special transparent inks required for use on prior art cast-coated paper nor such careful handling by the printer. The densified coating of the paper embodying our invention does not absorb so much of the vehicle of ordinary printing ink into its interstices that the ink pigment left on the surface is chalky and dull-looking. The fact that the product of the present invention, while retaining all the advantages of appearance possessed by cast-coated paper, can at the same time be printed readily and satisfactorily by use of regular printing inks, both letter-press and lithographic inks, is a very valuable consideration from the viewpoint of the printer.

Another important advantage of the densified product of the invention is that it is not much more subject to damage from breaking of the coating during handling than are conventional supercalendered mineral-coated printing papers. The papers embodying our invention do not have to be handled with special care while being manipulated in the press room.

The swelling of the hydrophilic coating material in making our coated product may be controlled by variation of either one or both of two separate factors, namely; the composition of the coating itself and the composition of the aqueous liquid used. For example, variations can be made in the particular kind and in the quantity of hydrophilic material used in the coating. Commonly the hydrophilic material will be the adhesive, such as casein, glue, soy protein, polyvinyl alcohol, starch, etc., or mixtures of the same. The degree of swelling of the hydrophilic material will likewise depend upon whether or not any water-proofing or insolubilizing treatment has been given the coated product. For instance, it is common practice to subject the common hydrophilic adhesives used in coatings to the action of formaldehyde or other aldehyde to render them more or less insoluble. Such treatment definitely decreases the swellability of the material.

If the coating is found to be slow to swell upon application of water alone, it is frequently found that an aqueous ammoniacal solution will be much more efficacious in swelling the material. On the other hand, if an unusually susceptible material, such for example as a highly alkaline sodium caseinate, swells too much or takes up too much water, a little formaldehyde dissolved in the aqueous liquid used to wet the coating will decrease the swelling to the desired degree.

As has been stated, water or aqueous liquid must not be drained away into the paper base before the hydrophilic matter has had time to swell against the polished surface of the drying drum. By proper selection of the aqueous liquid applied, and control of the quantity thereof as well as by proper densification or calendering of the coating, it is possible to practice the invention when the paper base itself has little or no resistance to being wet by water. It may be advantageous to have the paper base surface-sized or surface filled, possibly because such treatment tends to lay down fibers which otherwise might project into the coating layer and act as wicks to lead away water therefrom at a later step in the process.

In practicing this invention the maximum temperature to which the drum is heated becomes an important consideration. If the drum is heated to a temperature so that the aqueous liquid which is fed to the nip trough boils, a large part of the coating on the paper entering the nip will be removed and become incorporated in the aqueous fluid in the nip. If this situation occurs the previously dried and compacted coating loses its identity and the resulting product is worthless. The resultant surface tends to resemble stippled plaster and has no finish which would be capable of receiving a printed impression.

It is desirable to maintain the temperature of the drum as high as possible in order to facilitate the rate of drying of the small amount of aqueous liquid which passes through the nip. However, care must be exercised so that this liquid does not evaporate at a rate of sufficient magnitude to form steam bubbles between the surface of the coating and the surface of the drum which would break the contact between these two surfaces. The generally preferred drum temperature is from about 160° to about 195° F.

It is believe that the most nearly perfect surfaces resulting from practice of the invention occur in those cases in which the hydrophilic coating swells the most quickly and to the greatest degree in the pressure nip. In such cases, however, it is desirable to avoid substantial swelling before the coating is pressed against the drying surface. This is accomplished by maintaining a pool of aqueous liquid in the nip trough formed by the press roll and the polished roll. A pool in the nip trough of an inch or two in depth is ample. The permissible depth, however, depends in part upon the speed at which the paper passes through the nip; in most cases the speed will be at least 100 feet per minute. At this speed and at liquid depths of one or two inches the surface of the coating is in contact with the aqueous liquid for only from 1/20 to 1/10 of a second before it passes into the nip and into contact with the polished roll. By keeping short the period of contact between the surface of the coating and the aqueous liquid the amount of material removed from the surface of the coating and washed away with the nip effluent is reduced. This holds the loss of coating weight to a minimum in this process.

Variations in glossy appearance of the product can be obtained by varying the exact conditions of treatment, the optimum conditions in general being best determined by experiment in each separate case. Nevertheless, very excellent appearance generally results in all cases even when no attempt is made to reach absolutely optimum conditions. The specular gloss values of papers embodying the present invention may be measured by a Scott-Aminco goniophotometer made by the American Instrument Company of Silver Spring, Maryland. In making the tests, the sample was illuminated by a beam of light making an angle of 70 degrees from normal to the sample surface, and the reflected light measured was at an angle also 70 degrees to the normal to the paper surface but on the opposite side of the normal, so that if the illumination was at plus 70 degrees the reflected light was at minus 70 degrees to the normal. The reflected light was passed through a lens and then through a slit aperture placed at the focal distance from the lens. The slit subtended an angle of 1° 38′ in the plane of the light beam and an angle of 5° 2′ across the plane of the beam, the angles being from the optical center of the lens. The numerical figures so obtained for specular gloss are in percentages of the light reflected from a highly polished flat black plate glass standard.

Measurements made as described upon usual supercalendered glossy-coated printing papers of the quality at present sold as No. 1 quality glossy-coated printing papers usually yield values of specular gloss between 10 and 15. Especially severe supercalendering may yield papers having specular gloss values of about 20. Never, so far as we know, do supercalendered coated papers have a specular gloss as high as 25. On the other hand, the product of the present invention has a specular gloss, measured as described, of at least 30, and preferably of about 35 or above. Most samples fall between 35 and 60 specular gloss, but frequently specular gloss values over 60 are reached. It is found, however, that increasing values of specular gloss beyond a certain point are not worthwhile because any sheet having a specular gloss as high as 40 is so excellent in appearance that little further improvement either in appearance or in printing qualities is observable by the users.

The improvement in printing qualities may be determined quantitatively by the tests for "affinity for ink" and "ink-setting time" described in Patent No. 2,395,992 of John W. Clark. Briefly, it may be said that the "ink-setting time" is time in seconds between the time the sheet is printed with a standard printing-ink and the time the ink applied ceases to look wet; it is a reliable indication of the receptivity of the sheet for printing ink. Generally speaking, papers having an ink-setting time of not over 40 seconds are considered to have excellent ink receptivity. The products of the invention usually show ink-setting times well under 40 seconds. Glossy-coated papers which are finished by the flint-glazing process or by the buffing process of the Clark Patent No. 2,439,704 invariably have ink-setting times considerably in excess of 40 seconds, and are considerably more difficult to print satisfactorily than are the products of this invention. The product of the invention is also free from the characteristic scratches found in flint-glazed and buffed paper.

Conventional mineral coatings can generally be treated according to the process of the invention provided they contain a hydrophilic water-swellable component which is not too water-resistant. Conventional pigment materials or mineral fillers suitable for use in coatings to be treated according to the invention include: clay, calcium carbonate, blanc, talc, titanium dioxide, ochre, iron oxide, ultramarine, colored lakes and toners and the like. Some embodiments of the invention are shown by the following specific examples:

EXAMPLE 1

A coating composition was prepared of the following ingredients:

| | Parts by weight, dry |
|---|---|
| Fine paper coating clay | 70 |
| Fine paper coating calcium carbonate | 30 |
| Casein (solvated by ammonia) | 15 |
| Water to make solids content 45%. | |

This composition was applied by means of an air-knife coater to one side of a paper body stock of 55 pounds ream weight which had been surface-sized with a starch solution. Enough coating was applied to amount to 15 pounds, dry weight, per ream of 500 sheets 25 x 38 inches in size. The coated web was dried and supercalendered to an average supercalendered finish. The supercalendered surface was then run into a nip against a heated chromium-plated drum while water was fed into the nip. The paper was removed from the drum when dry and was found to have a specular gloss value of 47.

EXAMPLE 2

A coating was prepared of the following ingredients:

| | Parts by weight, dry |
|---|---|
| Fine particle English clay | 30 |
| Fine particle Georgia clay | 35 |
| Fine particle calcium carbonate | 35 |
| Casein (solvated by $Na_4P_2O_7$) | 15 |
| Water to make solids content 44%. | |

This composition was applied to one side of a surface-sized paper body stock of 135 pounds weight per ream in quantity amounting to 16 pounds, dry weight, per ream and supercalendered to a normal supercalendered finish. The supercalendered surface was then run at 150 feet per minute into a nip against a steam heated polished chromium-plated drum four feet in diameter while an aqueous solution of 0.4% formaldehyde was fed into the nip and maintained at a depth of about ½ inch. The drum surface adjacent the nip was about 180° F. The paper was removed from the drum when dry and was found to have a specular gloss value of 50.4.

EXAMPLE 3

A coating composition was prepared of the following ingredients:

| | Parts by weight, dry |
|---|---|
| Fine coating clay | 60 |
| Fine calcium carbonate | 40 |
| Starch, enzyme converted | 16 |
| Casein, solvated by ammonia | 4 |
| Styrene-butadiene copolymer (latex form) | 4 |
| Water to make solids content 46%. | |

This coating composition was applied to one side of a conventional paper body stock of 55 pounds weight per ream in amount equal to 15 pounds per ream, dry weight. The coated web was dried and supercalendered to a good supercalendered finish. The supercalendered surface was then run into a nip against a heated chromium-plated drum while an aqueous solution containing 0.6% of ammonia was fed into the nip. The paper was removed from the drum when dry and was found to have a high gloss and an attractive appearance. The specular gloss value was over 35.

EXAMPLE 4

A coating composition was prepared of the following ingredients:

| | Parts by weight, dry |
|---|---|
| Fine paper coating clay | 100 |
| Casein (solvated by ammonia) | 17.4 |
| Ammonium stearate | 0.65 |
| Water to make solids of 46.5%. | |

This coating was applied to one side of a surface filled paper of about 51 pounds ream weight, about 15 pounds dry weight of coating being applied per ream. The paper was dried and supercalendered. The supercalendered surface was run into a nip with the coated side against a heated chromium-plated drum while water was fed into the nip. The surface of the coating was dried in contact with the drum and released cleanly when dry. The specular gloss of the finished sheet was 59.5.

EXAMPLE 5

A coating composition was made of the following ingredients:

| | Parts by weight, dry |
|---|---|
| Fine paper-coating clay | 65 |
| Fine paper-coating calcium carbonate | 35 |
| Casein (solvated by ammonia) | 16 |
| Water to make solids 42%. | |

This coating composition was applied to both sides of a surface-sized paper base of about 68 pounds ream weight, about 16 pounds, dry weight, of coating being applied to each side of the sheet. The paper was dried, and supercalendered on both sides. The supercalendered web was then run into a nip with one side against a heated polished chromium-plated drum while the nip was kept flooded with an aqueous solution containing 1.0 percent of dissolved ammonia and 0.25 percent of dissolved ammonium stearate. The sheet was dried in contact with the polished drum and then removed. The sheet was then reversed and run into a nip with the other coated side in contact with a heated polished chromium-plated drum while the nip was kept flooded with an aqueous solution containing 0.8 percent ammonia, 0.4 percent hexamethylenetetramine and 0.25 percent of ammonium stearate. The sheet was dried in contact with the drum and was then removed. The specular gloss of the first treated side was 40 and of the second treated side was 41.

Accordingly we believe ourselves to be the first to discover that a superior high gloss can be produced on a supercalendered coated sheet by wetting the surface of the densified coating sufficiently to cause the hydrophilic component of the coating to swell and bringing the wetted surface into contact with the highly polished surface of a heated roll under pressure part of which may be supplied by the swelling of at least part of the hydrophilic component of the coating to swell and bringing the wetted roll and a suitable backing roll, and that by so doing a paper sheet may be produced having on one or both sides a densified mineral-coating of a density comparable to a usual supercalendered mineral-coating, but having a specular gloss of at least 30, and preferably at least 35, as measured as described on a Scott-Aminco goniophotometer; and the coated surface being easily printable by the same techniques and same printing inks customarily used in printing supercalendered mineral-coated paper.

The invention is illustrated in the accompanying drawings in which:

FIG. 1 represents a greatly magnified cross-section of coated paper prior to supercalendering, FIG. 2 represents a cross-section of the same paper after supercalendering, FIG. 3 represents a cross-section of the same paper after the gloss treatment, and FIG. 4 is a flow sheet of the process.

In FIG. 1, 1 is the paper body stock and 2 the coating comprising the pigment particles 3 and the adhesive 4. The porosity of the body stock and of the coating cannot be illustrated but as appears in FIG. 2 both the body stock and the coating have been densified by reduction of the degree of porosity. The number and size of the pigment particles has not been reduced but they have been brought into closer proximity to each other. It will be seen further that the surface of the coating of the supercalendered sheet in FIG. 2 is more nearly level than in FIG. 1. As shown in FIG. 3 the coating has been slightly swelled or expanded by the gloss treatment and its surface has been further smoothed and levelled.

It will be appreciated that the illustrations in FIGS. 1 to 3 are not intended accurately to represent the structure of the paper but are given merely to show applicants' conception of the effects of the supercalendering and gloss treatments upon the body stock and coating of a sheet of coated paper.

In FIG. 4, 5 is a feed roller for the paper body stock, 6 is a conventional air knife coating unit, 7 a dryer, 8 a supercalender, 9 the molding drum having a highly polished chromium surface, 10 a pressure roller, 11 a windup roller and 12 the paper web. The movement of the paper through the apparatus from the feed roller 5 to the windup roller 11 is indicated by arrows. The pool of wetting liquid in the nip between the molding drum and the paper web is shown at 13.

It is believed that in carrying out the preferred method of this invention a thin film or layer of aqueous liquid is formed on the surface of drum 9 as the coated paper passes through the nip of the press roll surface 10 and the drum surface. Hence it is believed that the wetted surface of the coating after passing through the nip pool is pressed against a thin film or layer of aqueous liquid on the drum surface and as the paper revolves with the hot drum surface, water from both said aqueous liquid in the film and the wetted coating surface is evaporated and passes through the paper as vapor. The terms "static adhesive contact with," "static contact with," "immovable contact with" and "forcible contact with" a polished surface, polished finishing surface or the surface of the finishing roll as used in the specification and claims include contact with such a surface which carries a thin film or layer of the aqueous liquid which is supplied to the nip of the press and the finishing rolls.

This application is filed as a continuation in part of our application Serial No. 210,214, filed February 9, 1951, which was a substitute for our application Serial No. 207,112 filed January 22, 1951, both now abandoned.

Although it has been attempted to explain the theory of the present invention, it is not intended that the present invention be limited to such theory.

It should be understood that the present disclosure is for the purpose of illustration only and that the present invention includes all modifications and equivalents which fall within the scope of the appended claims.

We claim:

[1. A method comprising applying aqueous liquid to the dry surface of the coating of a supercalendered coated paper, the coating of which comprises a water swellable hydrophilic material, subsequently pressing the resulting moist surface into static adhesive contact with a highly polished finishing surface and drying the paper while in contact with said finishing surface.]

[2. A method comprising applying aqueous liquid to the surface of the coating of a dry, supercalendered coated paper, the coating of which contains a water-swellable hydrophilic material, as nearly simultaneously as possible with the application of said liquid, pressing said surface into static contact with a highly polished finishing surface and drying the paper while in contact with said finishing surface.]

[3. The process of claim 2 wherein said finishing surface is wet with aqueous liquid when said surface of the coating is pressed thereagainst.]

[4. A method comprising applying a coating composition comprising a water swellable hydrophilic material to a web of paper, drying the resulting coated paper, supercalendering the dried coated paper, passing the surface of the coating of said dried, supercalendered coated paper through a pool of aqueous liquid, directly thereafter without removing the same from said pool pressing said surface into static adhesive contact with a heated, polished finishing surface and drying the paper while in contact with said finishing surface.]

[5. The process of claim 4 wherein said finishing surface is maintained wet with aqueous liquid when said surface of the coating is pressed thereagainst by passage through said pool.]

[6. In a process comprising applying aqueous liquid to the dry surface of the coating of a coated paper, the coating of which comprises a swellable hydrophilic material, subsequently passing said coated paper through a nip between a highly polished roll and a backing roll with the coating facing said polished roll and drying the paper while in static adhesive contact with said polished roll, the improvement comprising drying and subsequently supercalendering said coated paper before applying aqueous liquid to the surface of the coating and applying said aqueous liquid to said surface of the coating as it passes into said nip.]

[7. The process of claim 6 wherein said aqueous liquid is applied to said surface of the coating as it passes into said nip by maintaining a pool of aqueous liquid in said nip.]

[8. In a process comprising applying aqueous liquid to the surface of the coating of a coated paper, the coating of which comprises a swellable hydrophilic material and subsequently passing said coated paper through a nip between a highly polished roll and a backing roll with the coating facing said polishing roll and drying the paper while in static adhesive contact with said polished roll, the improvement comprising drying and subsequently supercalendering said coated paper before applying aqueous liquid to the same.]

[9. That improvement in the art of making polished paper which comprises compressing dry coated paper by super-calendering, passing the compressed paper between a press roll and a highly polished finishing roll, wetting the surface of the coating with aqueous liquid as the paper comes into contact with the finishing roll and drying the wetted surface of the coating while it is in immovable contact with the polished surface of the finishing roll, said coating comprising a water swellable hydrophilic material.]

[10. That improvement in the art of making polished paper which comprises supercalendering dry coated paper, swelling a hydrophilic component of the coating by the application of aqueous liquid to the surface of the coating, and while the swelling is taking place and before the body stock has been swollen bringing the wetted surface of the coating into forcible contact with a polished surface and drying the moistened surface while still in static adhesive contact with the polished surface.]

[11. That step in the process of making highly polished mineral-coated paper which consists in swelling the surface of a hard dry supercalendered sheet by the application of moisture to the coating as nearly as possible at the moment when the sheet passes between a pair of rolls one of which has a highly polished surface and drying it while in static adhesive contact therewith, said coating comprising a water swellable hydrophilic material.]

[12. A method comprising applying aqueous liquid to the dry surface of the coating of coated paper which has been calendered with enough pressure to densify the coating and to render the surface fairly level, said coating comprising a water swellable hydrophilic material, subsequently pressing the resulting moist surface into static adhesive contact with a highly polished finishing surface and drying the paper while in contact with said finishing surface.]

[13. A method as defined in claim 12 in which the aqueous liquid is applied to the coating by passing the paper through a pool thereof which is in contact with said finishing surface.]

[14. A method as defined in claim 12 in which the aqueous liquid is applied to the coating by passing the paper through a pool thereof which is supported in the nip betweeen a highly polished roll and a backing roll.]

[15. A high gloss mineral-coated paper substantially identical with the product obtainable by the method defined in claim 12.]

*16. The method of forming a high specular gloss on the surface of a coating on a paper web, the coating comprising a water-swellable hydrophilic adhesive material and having a smooth, dry, densified surface, which method includes the steps of: moving the paper web toward and pressing said coated surface against a polished heated finishing surface, applying a limited amount of an aqueous liquid to the surface of said coating during movement of the web so that liquid will be picked up by said coating to swell only the coating surface; limiting the quantity of*

*said liquid picked up by the surface of said coating to an amount no greater than that which can be readily absorbed by said coating to prevent penetration of said liquid through said coating and into the paper to an extent which would cause wetting and swelling of the paper web; pressing the surface of said coating while at least the surface portion of said coating is swelling and while at least a portion of said liquid is at the surface of said coating, against said polished heated finishing surface; and drying said coating while the surface of the same is in adhesive contact with said polished heated finishing surface.*

*17. The method of forming a high specular gloss on the surface of a coating on a paper web, the coating comprising a water-swellable hydrophilic adhesive material and having a smooth, dry, densified surface, which method includes the steps of: applying to said coating surface a limited amount of an aqueous liquid capable of penetrating into and swelling only said coating surface; pressing said coating surface against a polished heated finishing surface while said liquid is present at, penetrating into and swelling said surface; limiting the total quantity of said liquid penetrating into said coating before, during and after said pressing step to an amount which can be readily absorbed by said coating without wetting and swelling said backing sheet; and drying said coating while the surface thereof is in adhesive contact with said polished heated finishing surface.*

*18. The method of forming a high specular gloss on the surface of a coating on a paper web, the coating comprising a water-swellable hydrophilic adhesive material and having a smooth, dry, densified surface, which method includes the steps of: moving the coated surface of said paper web toward and against a polished heated finishing surface, applying a limited amount of an aqueous liquid to the said surface of said coating during said movement against said polished surface so that when said coating is pressed against said polished surface said liquid will be carried forward with said coating as a liquid film between said coating and said finishing surface, as free liquid in interstices between particles in said coating and as liquid absorbed only into said hydrophilic material; limiting the quantity of said liquid so carried forward with said coating to an amount no greater than that which can be readily absorbed by said coating to prevent penetration of said liquid through said coating and into the paper to an extent which would cause wetting and swelling of the paper web; pressing the surface of said coating while a portion of said liquid and at least the surface portion of said coating are swelling, against said polished heated finishing surface; and drying said coating while the surface of the same is in adhesive contact with said polished heated finishing surface.*

*19. A high gloss mineral coated paper substantially identical with the product obtainable by the method defined in claim 18.*

References Cited in the file of this patent or the original patent

UNITED STATES PATENTS

| | | |
|---|---|---|
| 2,003,065 | Boyce | May 28, 1935 |
| 2,069,786 | Van der Meulen | Feb. 9, 1937 |
| 2,293,278 | Cates | Aug. 18, 1942 |
| 2,304,818 | Grupe | Dec. 14, 1942 |
| 2,304,819 | Grupe | Dec. 14, 1942 |
| 2,611,717 | Sody | Sept. 23, 1952 |